United States Patent Office 2,700,029
Patented Jan. 18, 1955

2,700,029
PROCESS USING VINYL HYDROQUINONE POLYMERS

Harold G. Cassidy, New Haven, Conn.

No Drawing. Application December 31, 1949,
Serial No. 136,428

2 Claims. (Cl. 260—47)

This invention relates to the novel use of certain types of synthetic polymers for the treatment of substances to alter their state of oxidation. Such new processes have been made possible by the discovery that polymeric compounds of suitable structure containing redox groups are capable of reversible electron exchange with the molecules or ions of a contiguous phase. Polymeric compounds of this character are hereinafter referred to as electron exchange polymers or redox polymers. This invention relates also to novel polymers useful in oxidation and reduction processes. In the polymer or resin field emphasis is usually on the production of compositions stable to oxidation, thus seeking inertness in this respect. This invention is novel also in that oxidizable or reducible compositions are intentionally sought.

A process involving electron exchange using a redox polymer in accordance with this invention differs characteristically from the well-known ion exchange processes of the prior art. The latter involve primarily an exchange of anions or cations between the exchanger and the contiguous phase, while the present type of process requires that the exchanger either donates electrons to ions or molecules of a contiguous phase (reduction process during which the exchanger becomes oxidized) or accepts electrons from molecules or ions of a contiguous phase (oxidation process in which the exchanger becomes reduced). Polymeric substances capable of ion exchange have been defined as ionic solids containing a high molecular weight non-diffusible ion whose multivalent charge is balanced by relatively small diffusible ions of the opposite charge. While the electron exchange polymers of this invention may or may not fit the above definition, they must primarily be characterized by structurally repeated redox groups, that is groups having the property of reversible oxidation and reduction, which are bound together through linkages which do not prevent, though they may influence, the oxidation-reduction function. The reversibility implies no restrictions as regards rate.

The main object of the invention is to provide a novel method for the treatment of substances whereby the state of oxidation can be altered controllably by contacting with a redox polymer. This contacting may be done in either a homogeneous or a heterogeneous system as described in illustrative examples below.

The invention thus comprehends the furnishing of redox poylmers of suitable state and structure to accomplish a desired oxidation or reduction, as the case may be, and the regeneration of the polymer for this purpose by a simple treatment when necessary.

The invention likewise comprehends the various applications which may be made of redox polymers as in purification methods, stabilizing compositions of matter against deterioration by an otherwise potentially destructive atmosphere or environment, providing an essentially non-diffusing oxidizing or reducing polymer, and other uses which will readily occur to those skilled in the art.

These and other objects of the invention will become apparent from the illustrative details in the following description.

Vinylhydroquinone polymers were prepared as described below, and were shown to display reversible oxidation-reduction reactions by a number of illustrative experiments.

Monomeric vinylhydroquinone, a new compound, was prepared by the decarboxylation of 2,5-dihydroxycinnamic acid, through heating the acid under reduced pressure. The acid was prepared by treating ortho-coumaric acid with potassium persulfate according to the method of Neubauer and Flatow, Zeitschrift für physiologische Chemie, vol. 52, page 375 (1907). The synthesis followed this outline:

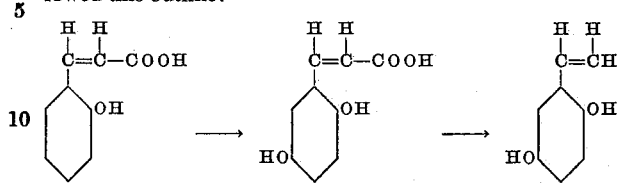

The 2,5-dihydroxycinnamic acid was heated to 200° C. in a vacuum sublimation apparatus at a reduced pressure of about 0.01 mm. of mercury, with evolution of carbon dioxide. The temperature was slowly raised to 220° C. over a period of one hour. When the apparatus had cooled, the crude sublimate was scraped from the cold surface. It was mixed with about 10 ml. of benzene per gram of acid decomposed, and the mixture was heated to boiling. The warm solution was then filtered to remove unchanged acid which had sublimed with the vinylhydroquinone. On cooling, vinyl hydroquinone was deposited from the solution in the form of colorless needle crystals, having a melting point of 111° C. and found to contain close to the theoretical contents of carbon and hydrogen corresponding to the formula $C_8H_8O_2$. Hydrogenation for verification of the structure indicated the presence of one ethylenic double bond per $C_8H_8O_2$ unit and resulted in the conversion of the new compound to ethylhydroquinone, as would be expected for a substance having the structure of vinyl hydroquinone.

Polymerized vinylhydroquinone was prepared by heating the monomeric substance under a variety of conditions. For example, when the monomer was sealed in an evacuated glass tube and heated for one hundred hours at 125° C., the product was an amber brittle solid, insoluble in benzene, soluble in alcohol, acetic acid, and acetone, somewhat soluble in boiling water, and becoming soft and tacky in cold water. For oxidation-reduction experiments, the product was freed of any residual monomer by powdering the solid and successively extracting several times with boiling benzene.

Similar products, varying essentially only in molecular weight, were produced by heating the monomer at different time-temperature schedules using temperatures from about 100° C. to 175° and periods of time from 2 hours to about 12 days. Many useful samples were prepared by heating the monomer under vacuum for one hour at 115°–120° C. followed by one hour at 100° C.

Evidence that such treatment of the monomer had brought about polymerization consisted not only in the altered solubility and appearance of the solid, but also in the increase in molecular weight, the apparent disappearance of the unsaturation of the vinyl group, as shown by hydrogenation experiments and the change in oxidation-reduction titrations as compared with similar measurements made with monomeric vinylhydroquinone.

Potentiometric titrations were carried out in accordance with the method described by Michaelis, starting at page 1051 of "Physical Methods of Organic Chemistry", edited by A. Weissberger (New York, 1946), using a bright platinum or gold electrode referred to a saturated calomel electrode.

Reproducible titrations were obtained in oxidation experiments using such oxidants as bromine, potassium dichromate, or ceric sulfate solutions, as shown in detail by Cassidy and by Updegraff and Cassidy, Journal of the American Chemical Society, vol. 71, pages 402–410 (February, 1949), using solutions of polymerized vinylhydroquinone in 25 to 90% acetic acid, or dispersions in dilute acetic acid, or in sulfuric acid-potassium sulfate, and other, buffers.

It was found that oxidized solutions or suspensions of the polymerized product could be reduced by hydrogen in the presence of palladium catalyst. Such reduced products after separation from excess hydrogen could again be oxidatively titrated, essentially duplicating the original potential curve. It was found that such cycles of oxidation and reduction could be repeated giving substantially the same titration results, with, however, some understandable changes in equivalent weight of the resin (see papers by Cassidy, and Updegraff and Cassity, referred to above).

On oxidation, the solutions were found to develop a pinkish-orange coloration which generally disappeared after reduction. Likewise, when the polymerized vinylhydroquinone was dispersed in dilute acetic acid as a milky-white suspension and then oxidized, the suspended particles became colored an orange-yellow. In the presence of a carrier such as bovine plasma albumen to stabilize the suspension, the mixture turned to a brick-red color which seemed to become less intense after the mid-point of the titration was passed. Reduction by hydrogen gas in the presence of palladium catalyst restored the suspension to a grayish color.

It has thus been made clear that polymerized vinylhydroquinone can be reversibly oxidized or reduced, that is, the oxidized form acts as an oxidizing agent and the reduced form as a reducing agent, in solution and in either the dispersed or flocculated states, with or without a supporting agent, provided that suitable oxidizable or reducible substances, respectively, are present in the contiguous medium.

The redox character of polymerized vinylhydroquinone has also been demonstrated by the following experiments. Filter paper was impregnated with polymerized vinylhydroquinone dissolved in glacial acetic acid and the paper was then dried in a vacuum desiccator containing potassium hydroxide. A piece of this resin-impregnated paper was placed between a pair of glass plates, the upper plate being provided with a small central hole through which liquid reagents could be added to the paper strip, while the latter was shielded from atmospheric oxygen.

*Experiment 1.*—A few drops of 2½% ferric chloride solution were introduced through the hole onto the paper. The solution spread forming an orange zone of oxidized polymer on the paper. A few drops of 1 N sulfuric acid were then introduced to wash the iron salt out from the zone. The top plate was removed and the paper streaked from the center outward with test reagents. Ferricyanide yielded Turnbull's blue; ferrocyanide yielded a very pale bluish streak. These tests showed that the polymer had reduced ferric ion to ferrous, while being oxidized itself to the orange colored form.

*Experiment 2.*—The above experiment was repeated with the same results. In addition the test reagents included alpha-nitroso-beta-naphthol, and the clear green color, evidence of ferrous ion, was observed.

*Experiment 3.*—The above experiment was repeated, but using untreated filter paper. No orange zone was observed, and no test for ferrous ion, but a good test for ferric ion was obtained with the reagents.

*Experiment 4.*—Potassium ferricyanide, in phosphate buffer of pH 6.4, was added to the treated paper. The resulting orange zone was washed with buffer to move the reagent out from the central zone. On streaking with solutions containing cupric, silver, ferric, and ferrous ions at different spots along the zone, clear evidence of the reduction by the polymer of the ferricyanide to ferrocyanide was obtained.

*Experiment 5.*—Iodine at a pH of 66.4, in potassium iodide solution, was added to the resin-treated paper. A central zone of an orange color was formed. On washing with buffer a clear disk of moisture moved out from the central zone. The paper gave no test for iodine (starch test) but was shown to contain iodide ion.

*Experiment 6.*—Experiment 5 was repeated up to the point where the zone was washed with buffer of pH 6.4, to move the iodide out. When this was accomplished, the zone was washed with 1 N sulfuric acid without apparent effect. Potassium iodide in 1 N sulfuric acid was now introduced to the zone, whereupon free iodine was immediately formed, and its presence was confirmed by the starch test.

These experiments gave conclusive evidence of the ability of the polymerized vinylhydroquinone to undergo reversible oxidation and reduction, and of the oxidized form to act as an oxidizing agent and of the reduced form to behave as a reducing agent.

Ebullioscopic molecular weight determinations of various samples of polymerized vinylhydroquinone, prepared as described above, yielded values ranging from about 300 to 400, indicating that these products consisted predominantly of the dimer or trimer of vinylhydroquinone. However, it was found that polymers of much higher molecular weight, displaying essentially similar reversible oxidation-reduction properties, could be prepared readily by the polymerization of vinyl hydroquinone after acetylation or benzoylation of its hydroxyl groups and removal of the protective groups by saponification following the polymerization reaction.

Acetylated vinylhydroquinone, or 2,5-diacetoxystyrene, was prepared by treating vinylhydroquinone in pyridine solution with slightly over the calculated amount of acetyl chloride. After treatment of the reaction mixture with hydrochloric acid solution, followed by extraction with ether, the ether solution was dried over anhydrous sodium sulfate. The ether was removed by distillation and the residue of light yellow oil was distilled under reduced pressure. The acetylated vinylhydroquinone fraction was collected over a distillation range of 183° to 188° C. at a pressure of 17 mm. of mercury, at a yield of 53.5% based on the vinylhydroquinone.

This new compound was polymerized by heating with a trace of benzoyl peroxide in an evacuated glass tube at 100° C. for six days. The crude polymer was a tough, rubbery amber solid. It was purified by dissolving in ethyl acetate and precipitating with approximately an equal quantity of petroleum ether. The fibrous solid which precipitated was washed with petroleum ether and dried in a vacuum disiccator over calcium chloride and paraffin wax, the latter for absorbing organic vapors. The purified product was a white amorphous solid, soluble in ethyl acetate, and swelling but not soluble in ethyl alcohol or benzene. The average molecular weight was about 1500, and the saponification equivalent was found to be 116, close to the theoretical value of 110.

Benzoylated vinylhydroquinone, or 2,5-dibenzoxystyrene, was prepared by treating vinylhydroquinone with slightly more than the calculated amount of benzoyl chloride in pyridine solution. After the reaction mixture was thoroughly agitated and allowed to stand for a few hours, it was treated with hydrochloric acid solution, resulting in the separation of an oil which crystallized after a few minutes. The product was washed with water, dried and recrystallized from 95% ethyl alcohol, at a yield of 78% based on the vinylhydroquinone. This new compound was isolated in the form of colorless crystals, found to contain 76.3% carbon and 5.1% hydrogen, values close to the theoretical 76.8% carbon and 4.7% hydrogen for dibenzoxystyrene. The purified material had a melting point of 96° C. and was soluble in benzene, toluene and ethyl acetate, while quite insoluble in water. The saponification value was found to be 176 and 168 for two different preparations, the calculated value being 172. The substance readily absorbed close to the theoretical volume of hydrogen for dibenzoxystyrene.

This new compound, with somewhat less than 1% added benzoyl peroxide, was sealed in a glass tube under vacuum and polymerized at 100° C. for 96 hours. The crude polymer was a pale amber, brittle glassy material. After extraction with hot ethyl acetate to remove any residual monomer and low molecular weight products, it was dissolved in benzene. The solution was then frozen in a bath containing acetone and solid carbon dioxide and the solvent was removed under reduced pressure, leaving a white fluffy amorphous powder. The polymer swells and becomes rubbery in ethyl acetate, is soluble in benzene and toluene, but insoluble in alcohol and in water. Ebullioscopic determinations indicated the molecular weight as greater than 15,000. The saponification equivalent was measured as 168, compared to the theoretical value of 172, and the percentages of carbon and hydrogen were determined to be 76.4% and 5.1%, respectively, close to the calculated values of 76.8% and 4.7% for poly-dibenzoxystyrene.

Polyvinylhydroquinone of correspondingly high molecular weight was prepared from polydibenzoxystyrene and polydiacetoxystyrene by saponification with 0.2 N sodium ethylate solution in ethyl alcohol. On neutralization of the saponification mixture with dilute aqueous hydrochloric acid, followed by further dilution with water, the high molecular weight polyvinylhydroquinone separates as a white flocculent precipitate.

An unusual property shown by this high polymer, whether prepared from either acylated polymer, is the intense blue color acquired by the solid if allowed to come into contact with an alkaline solution in the presence of air. The solid may retain such color for a matter of days, unless heated. Likewise the solid polymer acquires a reddish-blue color if it is contacted with concentrated sulfuric acid. Such coloration phenomena may be due to semiquinone formation and the persistence of the colors may be considered as evidence for the existence of semiquinone residues spatially separated along the polymer chains, being thus rendered incapable of rapid disproportionation such as presumably occurs in solutions containing hydroquinone and quinone. Semiquinones, or free radicals, are formed in the first oxidation step by removal of a hydrogen atom. In many cases, unless stabilized by resonance, they tend either to dismutate or to dimerize. The possibility of accumulation of free radical due to sequestration along the polymer chain is a new feature introduced into the field of oxidation and reduction and of polymer chemistry by the novel use of electron exchange polymers in accordance with this invention.

The color changes taking place during the oxidative treatment of the high polymers were similar to those observed for the lower molecular weight polymerized vinylhydroquinone, but much more pronounced. The course of the titrations was likewise of similar nature except that a smaller percentage of the theoretically available hydroquinone residues appeared to take part in the reaction.

High molecular weight polyvinylhydroquinone, prepared by saponification of polydibenzoxystyrene, was oxidized to the red form. On agitation with an aqueous solution of sodium hydrosulfite, the solid again turned white. After being washed thoroughly with water, it was suspended in 50% aqueous acetic acid solution and was titrated with an aqueous solution of potassium dichromate. The polymer again turned to a dark red color. When the end-point of the titration was reached, the suspension of polymer was reduced by hydrogen gas in the presence of colloidal palladium. After the excess hydrogen was swept out by nitrogen gas, the titration with dichromate was repeated. The end-point potentials observed during these titrations were close to those observed with low molecular weight polymers prepared by thermal polymerization of vinylhydroquinone.

The oxidation-reduction experiments using paper disks impregnated with polymer, described above, were repeated using the high polymer, prepared by the polymerization of acetylated vinylhydroquinone and subsequent removal of the acyl groups by saponification. The results of the oxidation-reduction experiments were essentially identical with those previously described.

The preparation of redox polymers is not limited to processes of polymerizing monomers of a single type containing a suitable redox group, since it is feasible to prepare useful polymers by the copolymerization of monomer containing redox groups with other monomers free of redox groups. For example, vinyldydroquinone has been copolymerized with monomeric styrene. In such a product, hydroquinone residues are presumably distributed differently along the polymer chains than in polyvinylhydroquinone.

The production of such copolymers in accordance with methods well known in the art, such as by bulk or emulsion copolymerization processes, offers the possibility not only of securing products having reversible oxidation-reduction properties of a desired range, but also possessing the physical properties necessary for specific uses.

For example, the preparation of a copolymer formed from monomeric vinylpyridine and monomeric vinylhydroquinone leads to a product characterized by repeated spaced units as side-chains along the polymeric chain some of which consist of hydroquinone groups, as the redox unit, and others of which consist of the pyridine group. The resulting polymer offers an interesting combination of properties in view of the alkaline nature of the pyridine groups and the acidic nature of the hydroquinone groups, as well as the redox nature of the latter.

Vinylhydroquinone may likewise be copolymerized with more than one monomeric compound. For example, copolymers may be prepared containing both styrene and vinylpyridine groups in addition to those of vinylhydroquinone. Valuable products may be prepared by substituting for either or both styrene and vinylpyridine, in whole or in part, other monomeric substances such as butadiene, acrylonitrile, methyl or other alkyl methacrylate, vinyl chloride, vinyl acetate, maleic anhydride, or isobutene, which substances may be classed as ethylenic monomers. In such copolymerizations it may at times be advantageous to protect the hydroxyl or other active groups of the redox monomer by such means as etherification or acetylation or other acylation.

The redox polymers which have been described above may all be classed as polymers having a redox unit structurally repeated as a side chain constituent of the polymer chain. Such a structure may, for example, be represented as follows for a portion of a polyvinylhydroquinone chain:

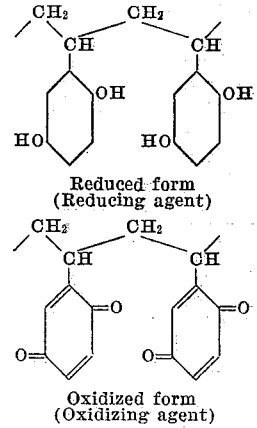

Reduced form
(Reducing agent)

Oxidized form
(Oxidizing agent)

In another class of redox polymers, the reversibly oxidizable and reducible group forms a part of the polymeric chain itself. For example, hydroquinone-formaldehyde resins contain hydroquinone residues some of which may be rendered accessible to reversible oxidation and reduction. The structure of such a polymeric molecule may, in portion, be represented by the following:

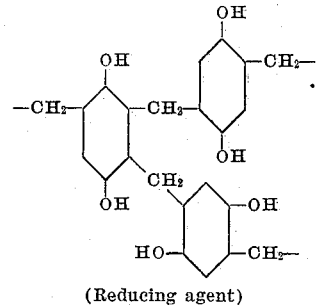

(Reducing agent)

Structures similar in principle are presented by substituted hydroquinone-formaldehyde resins, in which one or more hydrogen atoms of the hydroquinone nucleus are substituted by a methyl, ethyl or other alkyl group; and by copolymers in suitable ratios of phenol, resorcinol, or cresols, etc., with hydroquinones.

A further subclassification of redox polymers belonging to either of the main types described above consists of those polymers which are heteropolar in the oxidized form, that is, in the form in which the polymer is capable of acting as an oxidizing agent. Such polymers are exemplified by the alkyl polyvinylpyridinium halides, such as butyl polyvinylpyridinium bromide, which was described by R. M. Fuoss and U. P Strauss in Journal of Polymer Science, vol. 3, page 246 (1948). This polymer is apparently characterized by the repeated unit:

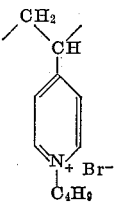

in its oxidized form.

Groups of this type may likewise be made part of copolymer chains, as was described above.

By suitable substitution the mid-point potential of the polymer, and hence its tendency to accept or donate electrons, can be adjusted. Thus it is well known that "electronegative" substituents affect the mid-point potential of a reducible or oxidizable substance (as hydroquinonyl or quinonyl) oppositely to "electropositive" substituents.

A whole gamut of mid-point potentials may therefore be obtained by employing suitable nuclei in the monomer which is polymerized, such as substituted hydroquinone, or condensed-ring hydroquinones, or indophenols, quinone imines or diimines, or by introducing substituents after polymerization. The mid-point potential can also be influenced by such factors as influence ionization of the exchange polymer, such as the hydrogen ion concentration of the ambient medium and its dielectric properties. These may be influenced, as pointed out above, by copolymerization with monomers which ultimately will bear acidic or basic groups. This latter arrangement permits the development of a self-buffering electron exchange polymer.

This invention comprehends not only the novel compounds and compositions of matter described above, but also the processes in which advantage can be taken, for the first time, of the ability of these substances to exchange electrons, under controllable conditions, with substances in a contiguous phase. Such electron exchange processes, that is, oxidation or reduction, are characterized by the important feature that the substance being oxidized or reduced is not contaminated by decomposition products necessarily produced during the action of conventional oxidizing or reducing agents.

In most processes of this character, in accordance with this invention, the redox polymer is to be employed in the solid insoluble form, in a suitable state of subdivision, and generally, in a form providing as extensive contacting surface as possible. The polymer may be prepared in a fluffy, porous form providing a high ratio of available surface, or active groups, to unit weight. Or, the polymer may be supported by a suitable inert carrier such as silica gel, aluminum oxide, kaolin, diatomaceous earth, or similar supporting agents well known in the art to provide a large surface area.

In a process involving, for example, the oxidation of ferrous ion to ferric ion, the solution containing the ferrous ion may be caused to flow through a column packed with a redox polymer which is initially in its oxidized form. The height of the column and rate of flow are so correlated that the dissolved iron in the outflowing solution has all been converted to the ferric stage. On depletion of the oxidized form of the polymer, as shown by the incomplete oxidation of the dissolved substance in the effluent, the column of polymer may be regenerated by treatment with a suitable oxidizing agent, for example, potassium dichromate solution, bromine water, hypochlorite, hydrogen peroxide, or others.

In the event that an oxidation step and a reduction step are to be carried out in two different processes in a given plant, the regeneration of each column of redox polymer may advantageously be effected by using the depleted column of originally oxidized polymer, now substantially in the reduced form, for the reduction step of one process. In the course of such treatment, the column of redox polymer becomes converted to the oxidized form, whereupon it becomes suitable for the oxidation step of the other process. The ability to apply reversible oxidizing or reducing agents in a differential countercurrent manner, thus obtaining maximum effect in utilizing the peculiar shape of the voltage-concentration curve, is a further novel feature.

By virtue of their redox character redox monomers such as vinylhydroquinone (i. e., with the active groups not protected by such means as acylation or etherification) may be used as chain terminating agents for the control of chain length in many polymerization processes in addition to the above uses.

Redox polymers may likewise find useful application, in the reduced form, for protecting compositions against the oxidizing effect of the atmosphere. In the reduced form, the polymers may be useful for removing otherwise harmful amounts of oxidizing gases from surrounding fluid media. In the oxidized form, the polymers may likewise serve to lower the concentration of reducing gases.

Relatively small proportions may have far-reaching stabilizing effects when employed as antioxidants, or to prevent undesirable gum formation in liquids. The properties are such as to suggest possible utility of redox polymers in antiseptic or other medicinal compositions.

It is also to be understood that redox groups may be introduce in accordance with this invention as a portion of copolymer chains for the purpose of accomplishing anti-oxidative and other stabilizing effects. Anti-oxidant effects are, for example, of significance in synthetic rubbers, while stability against damage by heat and light are important in articles made of polyvinyl plastics. These specific fields of use for the redox polymers of this invention are to be taken as illustrative, since other uses, as in photography, will readily occur to those skilled in the art.

In the appended claims, the term "redox" is to be understood as referring to the property of reversible oxidation and reduction.

I claim:

1. An oxidation-reduction process comprising providing a substance which comprises a synthetic organic polymer of ethylenically unsaturated monomeric material comprising vinylhydroquinone, which polymer has structurally repeated groups which are reversibly oxidizable and reducible and is thus capable of existence in an oxidized state and in a reduced state, converting said polymer to a starting state corresponding essentially to one of said states, contacting the thus-converted polymer with a liquid containing a solute, effecting a transfer of electrons between said solute and said polymer without substantial degradation of the polymer, separating said liquid and polymer, and reconverting said polymer to the said starting state.

2. A process in accordance with claim 1, in which the synthetic polymer is polyvinylhydroquinone.

References Cited in the file of this patent

UNITED STATES PATENTS

| Number | Name | Date |
|---|---|---|
| 1,028,074 | Kahl | May 28, 1912 |
| 1,933,975 | Haller | Nov. 7, 1933 |
| 1,940,727 | Moss | Dec. 26, 1933 |
| 2,006,517 | Seymour | July 2, 1935 |
| 2,224,865 | Folkers | Dec. 17, 1940 |
| 2,276,138 | Alderman | Mar. 10, 1942 |
| 2,285,797 | Bellefontaini | June 9, 1942 |
| 2,296,363 | Messer | Sept. 22, 1942 |
| 2,298,291 | Hartung | Oct. 13, 1942 |
| 2,373,058 | Silberkraus | Apr. 3, 1945 |
| 2,378,536 | Brubaker | June 19, 1945 |
| 2,414,415 | Rhodes | Jan. 14, 1947 |
| 2,459,835 | Monroe | Jan. 25, 1949 |
| 2,469,437 | Kirk | May 10, 1949 |
| 2,466,963 | Patrick | Apr. 12, 1949 |

OTHER REFERENCES

Beilsteins Handbuch der Organischen Chemie, vol. VI. page 954, Julius Springer, Berlin (1923).